United States Patent
Mishima et al.

(10) Patent No.: US 6,939,518 B2
(45) Date of Patent: Sep. 6, 2005

(54) PURIFIER AND GARBAGE DISPOSER

(75) Inventors: Motomichi Mishima, Hyogo (JP);
Mitsuyasu Ogawa, Shiga (JP);
Yoshiyuki Higashiyama, Shiga (JP);
Shigehiko Shimomura, Shiga (JP);
Tadashi Matsuyo, Shiga (JP); Seiichi Ueno, Shiga (JP); Hiromi Maeda, Shiga (JP); Masahiro Kimura, Shiga (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 708 days.

(21) Appl. No.: 09/933,334

(22) Filed: Aug. 20, 2001

(65) Prior Publication Data

US 2002/0041835 A1 Apr. 11, 2002

(30) Foreign Application Priority Data

Aug. 18, 2000 (JP) ........................................ 2000-248374
Jan. 11, 2001 (JP) ........................................ 2001-003330

(51) Int. Cl.$^7$ ............................................... B01D 53/86

(52) U.S. Cl. ........................... 422/177; 95/114; 95/115; 100/92

(58) Field of Search ................................ 422/168–183, 422/186.3; 110/238

(56) References Cited

U.S. PATENT DOCUMENTS 3,125,988 A * 3/1964 Gutkowski et al. .......... 119/506
5,740,725 A * 4/1998 Tomizawa et al. ............ 100/92
5,790,934 A * 8/1998 Say et al. .................... 422/186

FOREIGN PATENT DOCUMENTS

JP            05154348 A * 6/1993 ........... B01D/53/36
JP        2000218130 A * 8/2000 ........... B01D/53/86

* cited by examiner

Primary Examiner—Glenn Caldarola
Assistant Examiner—Tom P. Duong
(74) Attorney, Agent, or Firm—RatnerPrestia (57) ABSTRACT

A purifier to purify exhaust gas includes a case, a plurality of metal sheets disposed in the case, a catalyst held to each of the metal sheets, partition plates disposed between the respective metal sheets, a metallic pipe disposed piercing through the metal sheets, and a catalyst heater disposed in the metallic pipe. The plurality of metal sheets are arranged at predetermined intervals, and each of the metal sheets has at least one through-hole. The partition plates serve to partition the spaces between the respective metal sheets. The exhaust gas is circulated through the spaces between the respective metal sheets and then passes through the through-holes and is exhausted from the outlet of the case. In this way, it is possible to increase the number of metal sheets without increase of the pressure loss and to enlarge the outer diameter of same. As a result, the exhaust gas purifying capacity will be improved.

5 Claims, 11 Drawing Sheets

PRIOR ART

Fig. 13

PRIOR ART

PURIFIER AND GARBAGE DISPOSER

FIELD OF THE INVENTION

The present invention relates to a purifier which eliminates odor, oil, smoke or the like generated from garbage, and a garbage disposer equipped with the purifier.

BACKGROUND OF THE INVENTION

Figure 12:
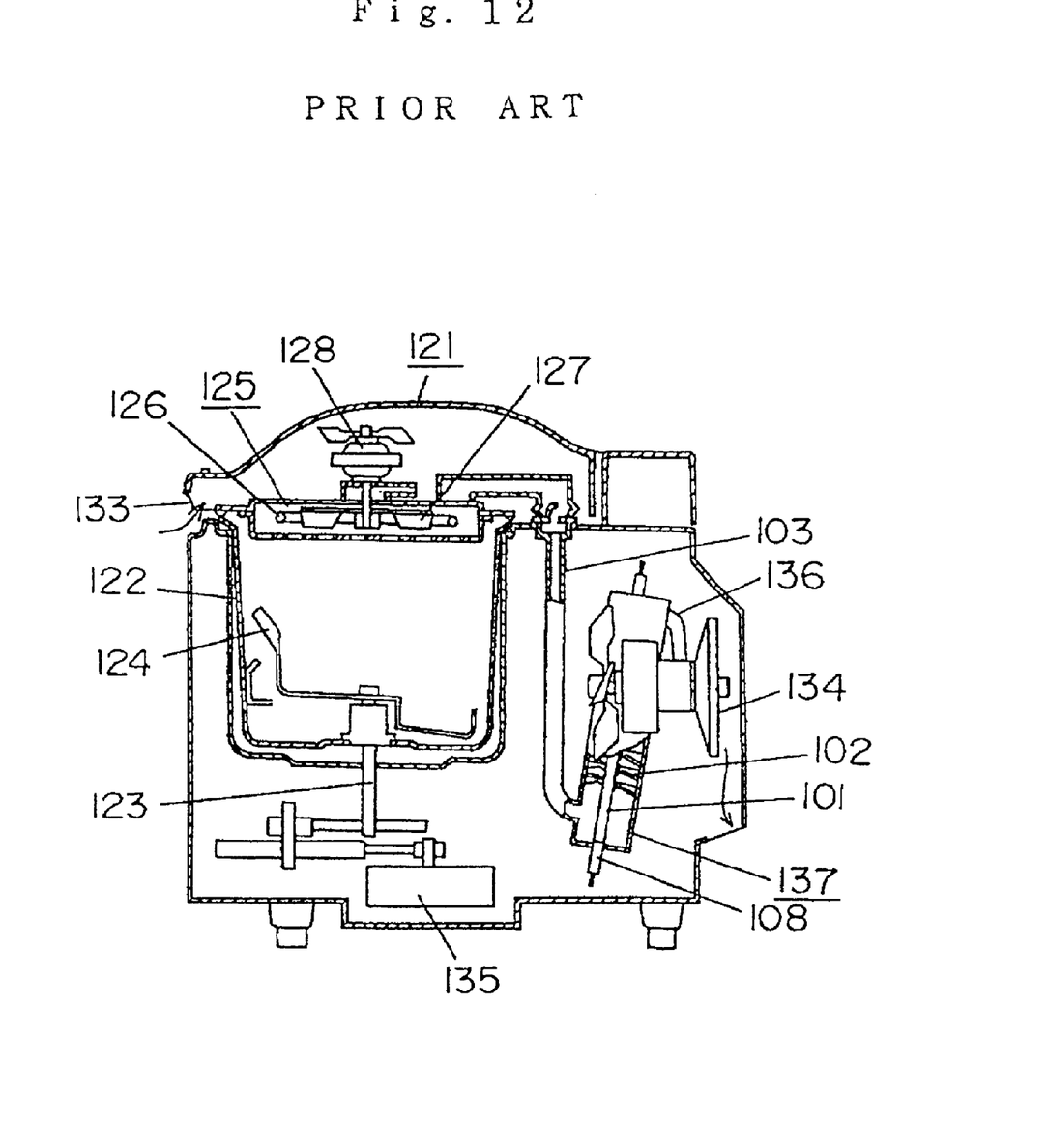
FIG. 12 is a cross-sectional view of a conventional garbage disposer.
Figure 13:
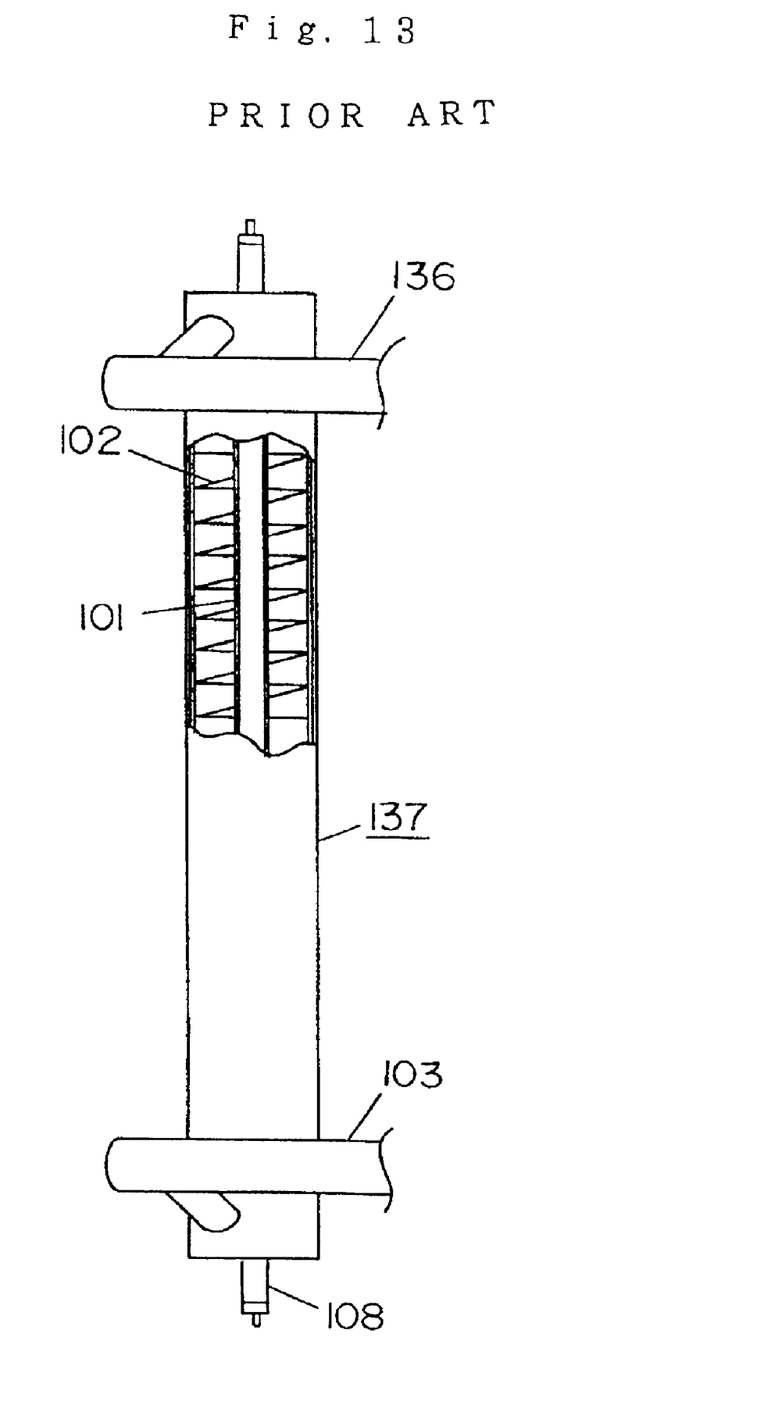
FIG. 13 is a cross-sectional view of a deodorizer of the garbage disposer of FIG. 11.

A conventional garbage disposer comprises a catalyst to eliminate odor, oil and smoke generated when the garbage is heated. Such conventional garbage disposer is configured as shown in FIG. 12 and FIG. 13. The description of a conventional garbage disposer will be given in the following.

As shown in FIG. 12, garbage disposer main body 121 comprises a storage section 122, rotary shaft 123, stirring blade 124, heating means 125, deodorizer 137, exhaust fan 134, and drive motor 135.

The garbage is stored in the storage section 122. The rotary shaft 123 is disposed nearly at the center of the storage section 122, and the stirring blade 124 is fixed on the rotary shaft 123. The heating means 125 is installed on top of the storage section 122 to heat the garbage. The heating means 125 has a drying heater 126 and a drying fan 127. The drying fan 127 applies hot air to the garbage, thereby heating the surfaces of the garbage. The drying fan 127 is driven by drying motor 128. An intake passage 103 and exhaust passage 136 are connected to the storage section 122, and the deodorizer 137 is disposed between the intake passage 103 and the exhaust passage 136. The deodorizer 137 comprises a metallic pipe 101, fin 102, catalyst, and catalyst heater 108 as shown in FIG. 13. The fin 102 is formed with a band metal sheet spirally wound around the metallic pipe 101. The catalyst is held to the fin 102. The catalyst heater 108 is disposed in the metallic pipe 101. When the catalyst is heated by the catalyst heater 108, the odor substance is oxidized and decomposed. Intake port 133 is formed at the top of the storage section 122. The exhaust fan 134 is disposed at the rear of the exhaust passage 136. The drive motor 135 serves to drive the rotary shaft 123.

In such conventional type garbage disposer, when the garbage disposer 121 is operated, the catalyst is heated by the catalyst heater 108 in the deodorizer 137. When the exhaust fan 134 is operated, air is taken in from the intake port 133. The air that contains odor in the storage section 122 is deodorized by the deodorizer 137, and the deodorized air is exhausted outside.

However, in such conventional garbage disposer, to improve the purifying capacity of the deodorizer 137, it is necessary to increase the number of turns of the fin 102. In case of a great many turns of the fin 102, the pressure loss will increase while the exhaust gas flows in the fin 102, affecting the smooth flow of the exhaust gas.

Also, as an another method of improving the purifying capacity, it is possible to increase the surface area of the fin 102. However, when the fin 102 is formed by spirally winding band metal sheet around the metallic pipe 101, it is necessary to make creases (not shown) on the inner diameter portion of the spiral fin 102 contacting with the metallic pipe 101. When the fin 102 is increased in outer diameter in order to increase the surface area of the fin 102, deeper creases will be formed thereon. Accordingly, the fin 102 cannot be manufactured. Also, in case the fin 102 is larger in outer diameter, it is difficult to make the circumference of the spiral fin 102 uniformly circular. Therefore, the spiral fin 102 cannot be enlarged in outer diameter.

SUMMARY OF THE INVENTION

A purifier of the present invention to purify exhaust gas comprises:

(a) a case having an inlet and an outlet;

(b) a plurality of thin plates disposed in the case, where the plurality of thin plates are arranged at predetermined intervals, and each of the thin plates has at least one through-hole;

(c) a catalyst held to each of the thin plates;

where the catalyst has a function of purifying the exhaust gas;

(d) partition plates disposed between the respective thin plates, where the partition plates partition the spaces between the respective thin plates; and (e) a catalyst heater to heat each of the thin plates, wherein the exhaust gas enters into the case from the inlet, and passes through the spaces formed between the respective thin plates, and the respective through-holes, and is exhausted from the outlet.

Preferably, the through-hole and the partition plate are disposed in such positions that the exhaust gas is circulated through each of the spaces.

Preferably, the catalyst has a function of deodorizing the exhaust gas.

By this configuration, it becomes possible to increase the number of the thin plates with the catalyst held thereto without increase of the pressure loss. Further, the outer diameter of each thin plate can be enlarged. Thus, the total surface area of the plurality of thin plates may be increased. Accordingly, when the exhaust gas passes through the plurality of thin plates, the exhaust gas contacting area of the thin plates will be increased. Also, the exhaust gas comes in contact with the catalyst in larger area. As a result, the purifying capacity of the purifier may be improved.

A garbage disposer of the present invention comprises:

a storage section to store garbage;

a main heater to heat the storage section; and a purifier connected to the storage section, wherein the purifier is the one described above, which purifies the exhaust gas generated from the garbage.

Preferably, the garbage disposer comprises a temperature detector.

By this configuration, the capacity of purifying the exhaust gas generated from the garbage disposer will be improved. Further, in case of abnormal combustion in the purifier, it is possible to stop the operation of the garbage disposer main body. Accordingly, burn-out trouble of the catalyst heater or damage to the purifier can be prevented. As a result, the safety of the garbage disposer will be enhanced.

DETAILED DESCRIPTION OF THE INVENTION

A purifier in one embodiment of the present invention comprises:

(a) a case having an inlet and an outlet;

(b) a plurality of thin plates disposed in the case, in which the thin plates are arranged at predetermined intervals, and each of the thin plates has at least one through-hole;

(c) a catalyst held to each of the thin plates;

in which the catalyst has a function of purifying the exhaust gas;

(d) partition plates disposed between the respective thin plates, in which the partition plates partition the spaces between the respective thin plates; and (e) a catalyst heater to heat each of the thin plates, wherein the exhaust gas enters into the case from the inlet, and passes through the spaces formed between the respective thin plates, and each of the through-holes, and is exhausted from the outlet.

A garbage disposer in one embodiment of the present invention comprises:

a storage section to store garbage;

a main heater to heat the storage section; and a purifier connected to the storage section, wherein the purifier is the one described above.

Preferably, the through-hole and the partition plate are disposed in such positions that the exhaust gas is circulated through each of the spaces.

Preferably, the purifier further comprises a pipe; the exhaust heater is installed in the pipe; and the plurality of thin plates are fixed around the pipe.

Preferably, each of the thin plates is made of metal, and the pipe is also made of metal.

Preferably, the catalyst has a function of deodorizing the exhaust gas.

Preferably, the case has a cylindrical shape.

Preferably, the partition plate is bonded to each of the thin plates.

Preferably, the partition plate is formed by cutting and raising the thin plate.

Preferably, each of the thin plates is substantially circular in shape, and the case is substantially cylindrical in shape.

Preferably, the purifier further comprises wire netting disposed along the periphery of the thin plates.

Preferably, the wire netting holds other catalyst.

Preferably, the purifier further comprises a heat insulating material disposed between the circumference of the thin plates and the inner wall of the case.

Preferably, the purifier further comprises a radiation fin disposed in the case, and the catalyst heater is installed piercing through the radiation fin.

Preferably, the radiation fin holds a further catalyst.

Preferably, there is further provided a honeycomb catalyst disposed in the case, and the exhaust gas passes through the honeycomb catalyst.

Preferably, each of the thin plates has irregularities formed on its surface, and the catalyst is disposed on the irregular surfaces, and the exhaust gas comes in contact with the irregular surfaces having the catalyst while passing thereon.

Preferably, the partition plate includes a plurality of partition plates;

the through-hole includes a plurality of through-holes;

a plurality of spaces partitioned by the plurality of partition plates are formed between the respective thin plates;

the spaces are connected to each other by the respective through-holes; and the exhaust gas enters into the case from the inlet and is circulated separately passing through the respective spaces and the respective through-holes and is exhausted from the outlet.

Preferably, each of the through-holes is formed radially from the center of the thin plate, and each of the partition plates is also formed radially from the center of the thin plate.

Preferably, the catalyst heater includes a plurality of catalyst heaters, and the plurality of catalyst heaters are disposed piercing through the plurality of thin plates so that the plurality of catalyst heaters go through the respective spaces.

Preferably, the purifier further comprises an external radiation fin;

at least two out of the plurality of catalyst heaters have a U-shaped bend portion and straight portions formed at either end of the bend portion;

each of the straight portions is disposed piercing through the thin plates;

the bend portion is located outside the case; and the external radiation fin is installed at the bend portion.

Preferably, the purifier further comprises an external radiation fin;

the plurality of catalyst heaters include a first catalyst heater and a second catalyst heater;

the first catalyst heater includes a U-shaped first bend portion and two first straight portions formed at either end of the bend portion;

the second catalyst heater includes a U-shaped second bend portion and two second straight portions formed at either end of the bend portion;

each of the straight portions is disposed piercing through the thin plates;

each of the bend portions is located outside the case;

the external radiation fin is installed at each of the bend portions;

the first bend portion and the straight portions of the first catalyst heater are heated; and only the second bend portion of the second catalyst heater is heated, and the second straight portions are not heated.

Preferably, the purifier further comprises a temperature detector disposed near the inlet, and the temperature detector has a function of detecting the temperature of the catalyst heater and stopping the power supply to the catalyst heater.

Preferably, the purifier further comprises an outlet pipe disposed at the outlet, and a suction fan attached to the outlet pipe.

Preferably, the purifier further comprises an inlet pipe disposed at the inlet, and a heater disposed at the periphery of the inlet pipe.

Preferably, the purifier further comprises an inlet pipe disposed at the inlet; an outlet pipe disposed at the outlet; and a low-temperature catalyst which functions at a lower temperature as compared with the catalyst mentioned earlier; and the low-temperature catalyst is disposed in at least one of the inlet pipe and the outlet pipe.

Preferably, the purifier includes a temperature detector, and when the temperature detector detects abnormal combustion in the purifier, the operation of at least one of the main heater and the catalyst heater is discontinued.

Preferably, the catalyst heater is installed piercing through each of the thin plates.

Due to the above configuration of the purifier, it becomes possible to increase the number of the thin plates holding the catalyst without increase of the pressure loss and, in addition, it is possible to enlarge the outer diameter of each thin plate. Thus, the plurality of thin plates will become larger in total surface area. Accordingly, when the exhaust gas passes through the plurality of thin plates, the exhaust gas contacting area of the thin plates will be increased. Also, the exhaust gas comes in contact with the catalyst in larger area. As a result, the purifying capacity of the purifier may be improved.

Due to the above configuration of the garbage disposer, the capacity of purifying the exhaust gas generated from the garbage disposer will be improved. Further, in case of abnormal combustion in the purifier, it is possible to stop the operation of the garbage disposer main body. Accordingly, burn-out trouble of the catalyst heater or damage to the purifier can be prevented. As a result, the safety of the garbage disposer will be enhanced.

An exemplary embodiment of a purifier of the present invention will be described in the following. The description is given with respect to a deodorizer to eliminate odor substance contained in the exhaust gas, which serves as a purifier in the following exemplary embodiment.

Figure 1:
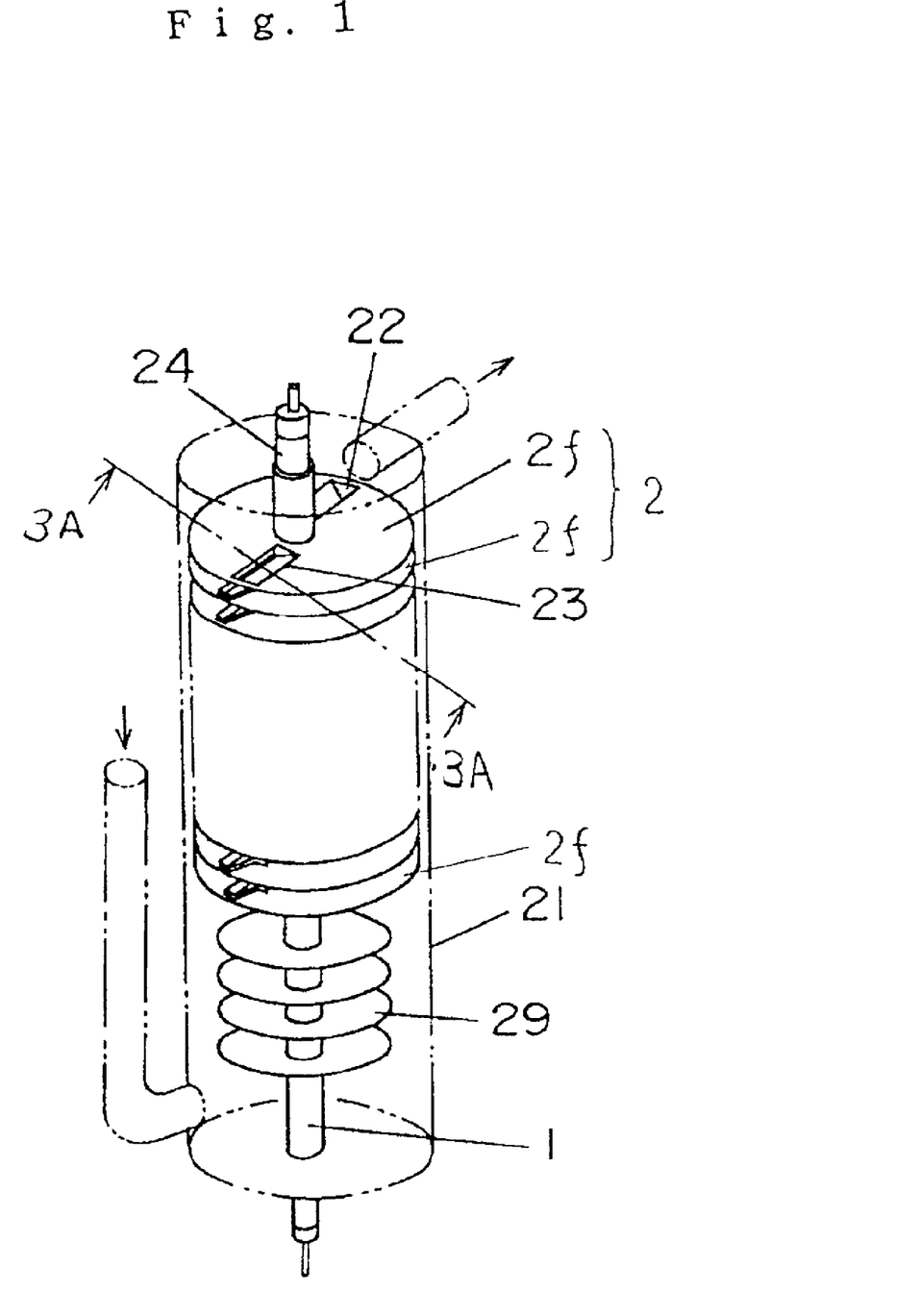
FIG. 1 is a perspective view of a deodorizer as a purifier of the first exemplary embodiment of the present invention.
Figure 2:
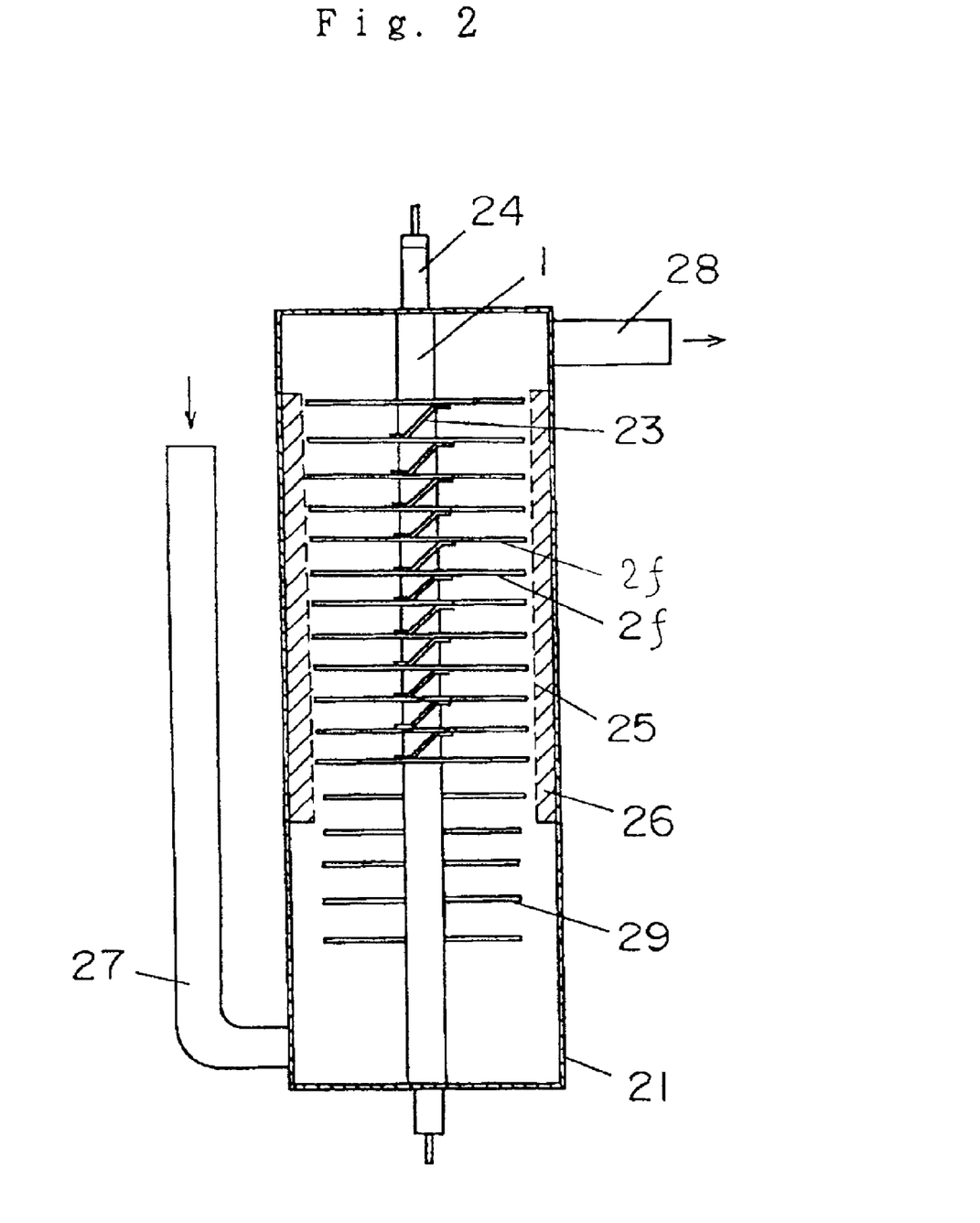
FIG. 2 is a cross-sectional view of the deodorizer of FIG. 1.
Figure 3:
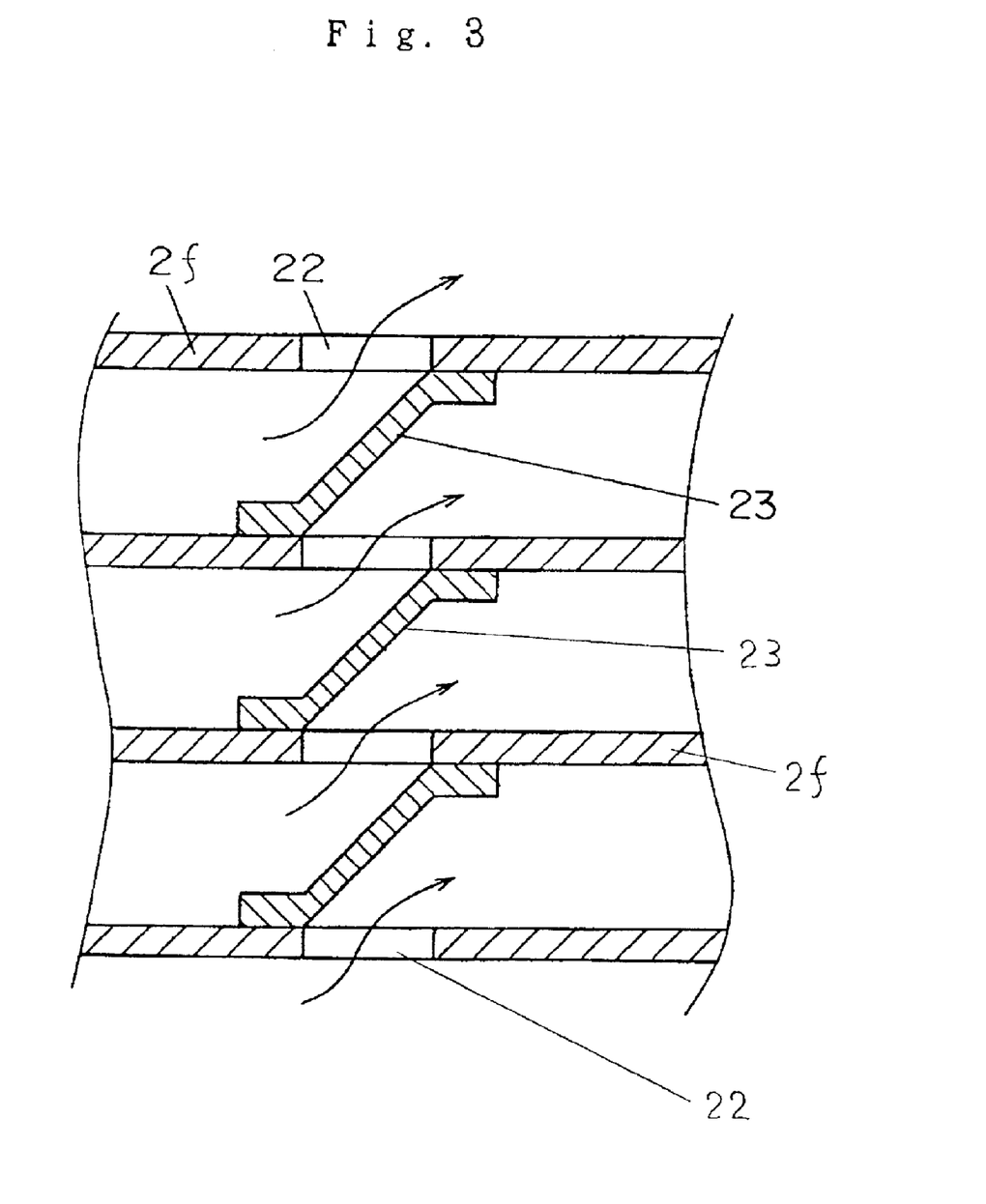
FIG. 3 is a cross-sectional view of 3A—3A line of FIG. 1.

Exemplary Embodiment 1:

FIG. 1 is a perspective view of a purifier in the first exemplary embodiment of the present invention. FIG. 2 is a cross-sectional view of the purifier of FIG. 1. FIG. 3 is a cross-sectional view of the 3A—3A line of FIG. 1.

In FIG. 1 and FIG. 2, the deodorizer as a purifier comprises a metallic pipe 1, a plurality of fins 2, case 21, and catalyst heater 24. Preferably, the deodorizer further comprises wire netting 25, heat insulating material 26, and radiation fin 29.

The plurality of fins 2 include a plurality of metal sheets 2f and a plurality of partition plates 23. Through-hole 22 is formed radially from the center of each metal sheet 2f. Preferably, two through-holes 22 are formed therein. Each of the metal sheets 2f is fixed along the periphery of the metallic pipe 1. Preferably, each of the metal sheets 2f is circular in shape. That is, each of the metal sheets 2f is located along the periphery of the metallic pipe 1 so that the metallic pipe 1 is pierced through the center of the circular metal sheets 2f. The two through-holes 22 are formed radially from the center of the metal sheet 2f. The plurality of fins 2 have a catalyst. Preferably, the catalyst is held to the surface of each metal sheet 2f. Also, as the catalyst, a deodorizing catalyst capable of eliminating odor substance contained in the exhaust gas is employed.

The plurality of fins 2 installed along the periphery of the metallic pipe 1 are stored in the case 21. In the case 21, partition plates 23 are disposed between the respective metal sheets 2f. That is, the space between the metal sheets 2f opposing to each other is partitioned by two partition plates 23. Thus, as shown in FIG. 3, two air passages are formed.

the catalyst heater 24 1 is installed in the metallic pipe. The wire netting 25 is wound around the periphery of the plurality of fins 2. Preferably, the wire netting 25 has a catalyst, and the catalyst is held to the surface of the wire netting. Further, the heat insulating material 26 for sealing is wound around the periphery of the wire netting 25.

An inlet pipe 27 as an intake passage is disposed on the underside of the case 21. An outlet pipe 28 as an exhaust passage is disposed on the top of the case 21.

Radiation fins 29 are disposed under the plurality of fins 2, around the metallic pipe 1. The radiation fin 29 is installed in a position close to the inlet pipe 27. Preferably, the radiation fin 29 holds the catalyst.

The catalyst heater 24 is disposed in the metallic pipe 1. Preferably, the catalyst heater 24 is lower in watt density at the down-stream side of exhaust gas.

In the above configuration, the exhaust gas passes through the inlet pipe 27 and enters into the case 21. The gas in the case 21 passes through the radiation fin 29, and further passes through the plurality of fins 2 and is discharged out of the case 21 from the outlet pipe 28.

As shown in FIG. 3, two partition plates 23 are disposed near the through-holes 22 so that the space between the metal sheets 2f is partitioned by the two partition plates 23. That is, two passages are formed so that the exhaust gas that goes into the spaces between the respective metal sheets 2f is circulated by 180° and flows upward through the through-hole 22.

Each of the partition plates 23 is joined to the metal sheet 2f, for example, by bonding or welding.

In this way, the exhaust gas that enters inside the fins 2 is separated into two streams, and is circulated by 180° in the first space between the metal sheets and passes through the through-hole 22 to enter into the second space located up there. Repeating this motion, the exhaust gas is discharged out of the case 21 from the outlet pipe 28.

In this configuration, it is possible to install metal sheet 2f having a large outer diameter as desired. Further, many metal sheets 2f can be installed as desired. Thus, it is possible to increase the number of the fins 2 holding the catalyst. Also, it is possible to enlarge the outer diameter of the fin 2. Consequently, the total surface area of the plurality of fins will be increased. Accordingly, when the exhaust gas passes through the plurality of fins 2, the exhaust gas comes in contact with the surfaces of the metal sheets 2f in larger area. As a result, the capacity of purifying the exhaust gas may be improved without increase of the pressure loss.

Also, the radiation fin 29 has a function of radiating the heat of the catalyst heater 24. Due to the action of the radiation fin 29, abnormal heating of the catalyst heater 24 can be prevented.

Further, the wire netting 25 prevents the heat insulating material 26 for sealing wound around the periphery of fin 2 from getting into the space between the metal sheets 2f. As a result, the passage of the exhaust gas may be prevented from being narrowed.

Also, since the catalyst is held to the wire netting 25 and the radiation fin 29, the capacity of purifying the exhaust gas will be further improved.

In addition, as the exhaust gas comes more to the down-stream side, the catalyst heater 24 is decreased in watt density, that is, the watt density of the catalyst heater 24 at the upstream side of the exhaust gas becomes higher. Thus, the exhaust gas is mainly heated before passing through the fins 2. And, since the heated exhaust gas passes through the fins 2, the heat may be uniformly distributed in the plurality of fins 2. As a result, it is possible to improve the purifying capacity. In the present exemplary embodiment, the upstream side of exhaust gas is at the bottom of the case 21.

In the present exemplary embodiment, each of the metal sheets 2d has two through-holes 22, and two partition plates 23 are disposed between the metal sheets 2f. However, it is not limited to this configuration, but through-holes 22 and partition plates 23 being optional in number may be installed. In this case, each of the partition plates 23 is disposed close to each of the through-holes 22, and the through-holes 22 and partition plates 23 are arranged so that the exhaust gas is circulated through the spaces between the respective metal sheets 2f.

For example, when there are provided one through-hole 22 and one partition plate 23, the exhaust gas is circulated by 360° in the space and then goes upward through the through-hole 22. When there are provided three through-holes 22 and three partition plates 23, the exhaust gas is circulated by 120° in each of the spaces, and then goes upward through the through-hole 22. When there are provided four through-holes 22 and four partition plates 23, the exhaust gas is circulated by 90° in each of the spaces, and then goes upward through the through-hole 22.

Figure 4:
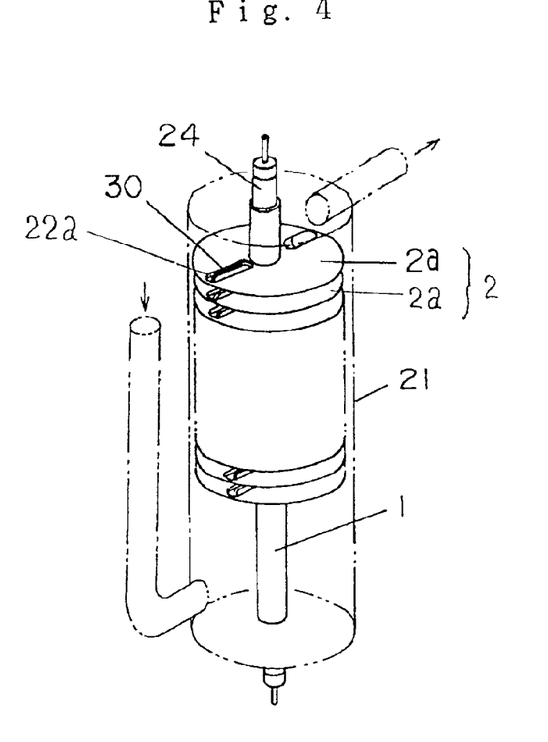
FIG. 4 is a perspective view of a deodorizer of the second exemplary embodiment of the present invention.
Figure 5:
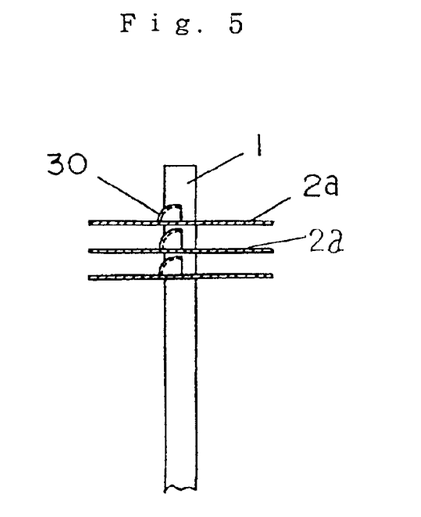
FIG. 5 is a fragmentary sectional view of the deodorizer of FIG. 4.

Exemplary Embodiment 2:

The second exemplary embodiment of the present invention will be described in the following with reference to FIG. 4 and FIG. 5. Here, same reference numerals are used for the same component elements as those in the first exemplary embodiment described above. The description of the elements of same reference numerals will be omitted. FIG. 4 is a perspective view of a deodorizer in the second exemplary embodiment of the present invention. FIG. 5 is a fragmentary sectional view of the deodorizer of FIG. 4.

In FIG. 4 and FIG. 5, a plurality of fins 2 include a plurality of metal sheets 2a. The plurality of metal sheets 2a are fixed around metallic pipe 1. Each of the metal sheets 2a has a plurality of raised portions 30. For example, in the present embodiment, there are provided two raised portions 30. The plurality of raised portions 30 are disposed radially from the center of metal sheet 2a. The raised portion 30 and through-hole 22 are formed by cutting and raising the metal sheet 2a. The plurality of fins 2 has a catalyst, and the catalyst is disposed on the surface of each metal sheet 2a. A space is formed between the metal sheets 2a, and the space is partitioned by the raised portions 30. Such fins 2 and metallic pipe 1 are disposed in case 21. Catalyst heater 24 is installed in the metallic pipe 1. The others are same in configuration as the first exemplary embodiment described above.

In such configuration, the exhaust gas that enters into the bottom of the case 21 is separated into two streams, and is circulated by 180° in the first space between the metal sheets and goes upward through the through-hole 22a to enter into the second space. Repeating this motion, the exhaust gas is discharged out of the case 21 from the outlet pipe.

In this second exemplary embodiment, there are provided two raised portions 30, but it is also possible to provide the raised portions 30 in optional number.

In this configuration, it is possible to dispose metal sheet 2a having a large outer diameter as desired. Further, it is possible to dispose a number of metal sheets 2a as desired. Thus, the number of fins 2 holding a catalyst and the outer diameter of same may be increased. And the total surface area of the fins will be increased, and accordingly, the exhaust gas comes in contact with the surfaces of metal sheets 2a in larger area while passing through the fins 2. As a result, the capacity of purifying exhaust gas may be improved without increase of the pressure loss.

Exemplary Embodiment 3:

The third exemplary embodiment of the present invention will be described in the following with reference to FIG. 6 and FIG. 7. Here, same reference numerals are used for the same component elements as those in the first exemplary embodiment described above. The description of the elements of same reference numerals will be omitted.

Figure 6:
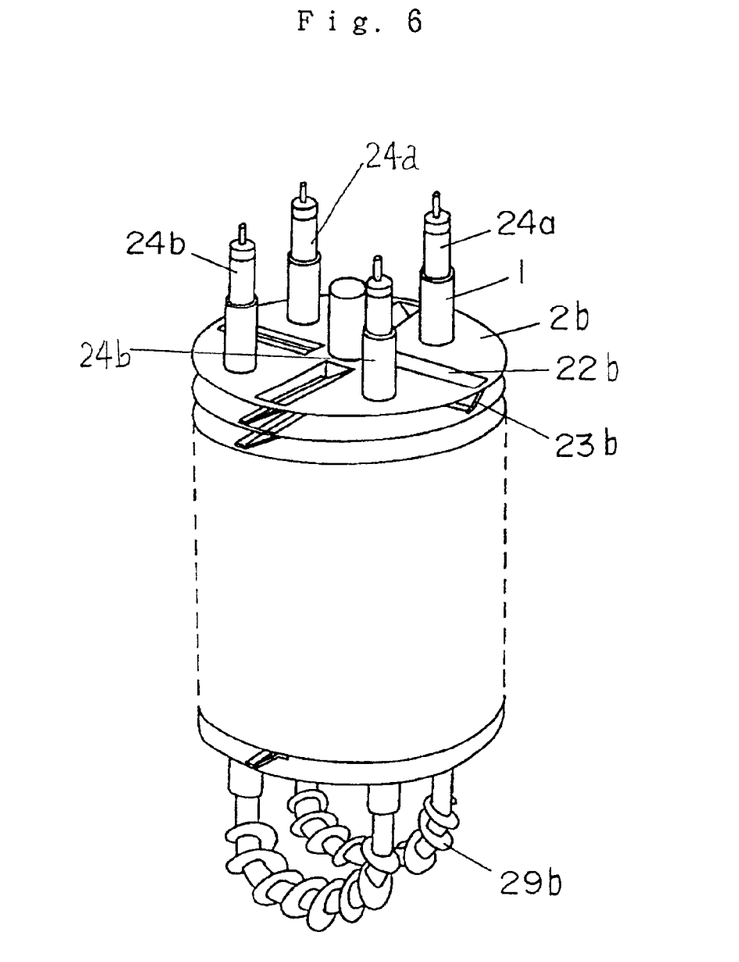
FIG. 6 is a perspective view of a deodorizer of the third exemplary embodiment of the present invention.
Figure 7:
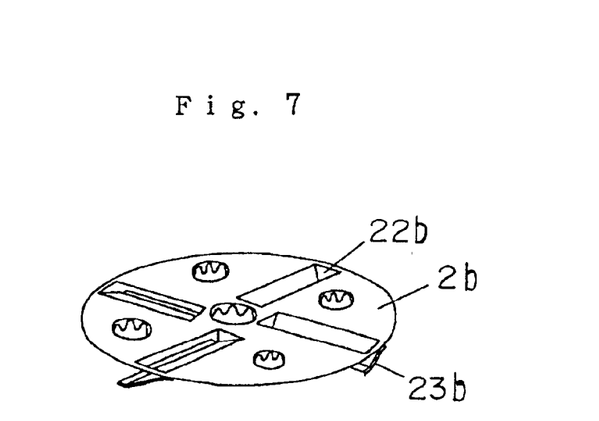
FIG. 7 is a perspective view of a fin of the deodorizer of FIG. 6.

In FIG. 6 and FIG. 7, a plurality of fins 2 are formed of a plurality of metal sheets 2b. Preferably, each metal sheet 2b is circular in shape. Four through-holes 22b are formed radially from the center of each circular metal sheet 2b. Four partition plates 23b are disposed in the space between the metal sheets 2b. The four partition plates 23b are disposed radially from the center of each circular metal sheet 2b. Each of the spaces between the respective metal sheets 2b is partitioned by the four partition plates 23b. A plurality of metallic pipes 1 are disposed piercing through the metal sheets 2b. Each of the metallic pipes 1 is disposed between the through-holes 22b or between the partition plates 23b. That is, the metallic pipes 1 are located piercing through each of the four separated spaces. A catalyst is held to the surfaces of the metal sheets 2b. For example, the partition plates 23b are formed by cutting and raising the metal sheets 2b, and the through-holes 22 are formed as a result of cutting and raising the metal sheets 2b.

The plurality of fins 2 and partition plates 23b are stored in a case (not shown). Thus, four passages are formed inside the plurality of fins 2. In each of the metallic pipes 1 is disposed a first catalyst heater 24 or a second catalyst heater. Preferably, the first catalyst heater 24a includes a U-shaped bend portion and straight portions, and external radiation fin 29b is disposed around the bend portion. The second catalyst heater 24b includes a U-shaped bend portion and straight portions, and external radiation fin 29b is disposed around the bend portion. The whole of the first catalyst heater 24a is heated. Only the bend portion of the second catalyst heater 24b is heated, while the straight portions of the second catalyst heater 24b is not heated. The straight portions of each catalyst heater are disposed in the metallic pipe 1, and the bend portion of each catalyst heater is located outside the metallic pipe 1. The catalyst is disposed on the surface of radiation fin 29b.

In the above configuration, the exhaust gas entering into the case is separated into four passages in the first space partitioned by the four partition plates 23b. The exhaust gas entering into each passage is circulated by 90° and then flows upward into the second space. Thus, the exhaust gas sequentially moves upward and is finally discharged out of the case.

In this way, due to the above configuration, it is possible to increase the number of the fins 2 holding the catalyst without increase of the pressure loss. Accordingly, the surface area of the fins 2 may be increased, thereby improving the exhaust gas purifying capacity by catalyst. Also, since a plurality of catalyst heaters 24 are disposed, each of the metal sheets 2b can be enlarged in outer diameter, and consequently, the surface area of the fins 2 will be further increased. Therefore, when the exhaust gas passes through the fins 2, the exhaust gas comes in contact with the catalyst in larger area. As a result, the exhaust gas purifying capacity will be further improved.

Also, the radiation fin 29b is disposed on the exposed portions of the catalyst heaters 24a, 24b. In this configuration, the heat of the catalyst heaters 24a, 24b is radiated from the radiation fin 29 being exposed, thereby preventing the catalyst heaters 24a, 24b from abnormal heating.

Also, the whole of the first catalyst heater 24a is heated, while only the U-shaped portion of the second catalyst heater 24b is heated. In this configuration, the plurality of fins 2 will be heated in a short time by the first catalyst heater 24a wholly heated until the catalyst is activated by the heat. After the catalyst is activated, the exhaust gas is mainly heated, before passing through the fins 2, by the second catalyst heater 24b with only the lower U-shaped portion heated, and the heated exhaust gas passes through the fins 2. In this way, the plurality of fins 2 become uniform in heat distribution. As a result, the exhaust gas purifying capacity will be further improved.

As described above, by this exemplary embodiment, it is possible to prevent the catalyst heater 24 from abnormal heating since the catalyst heaters 24a, 24b are provided with the radiation fin 29b. In addition, the purifying capacity will be further improved since a catalyst is held to the radiation fin 29b.

Exemplary Embodiment 4:

The fourth exemplary embodiment of the present invention will be described in the following with reference to FIG. 8. Here, same reference numerals are used for the same component elements as those in the third exemplary embodiment described above. The description of the elements of same reference numerals will be omitted.

Figure 8:
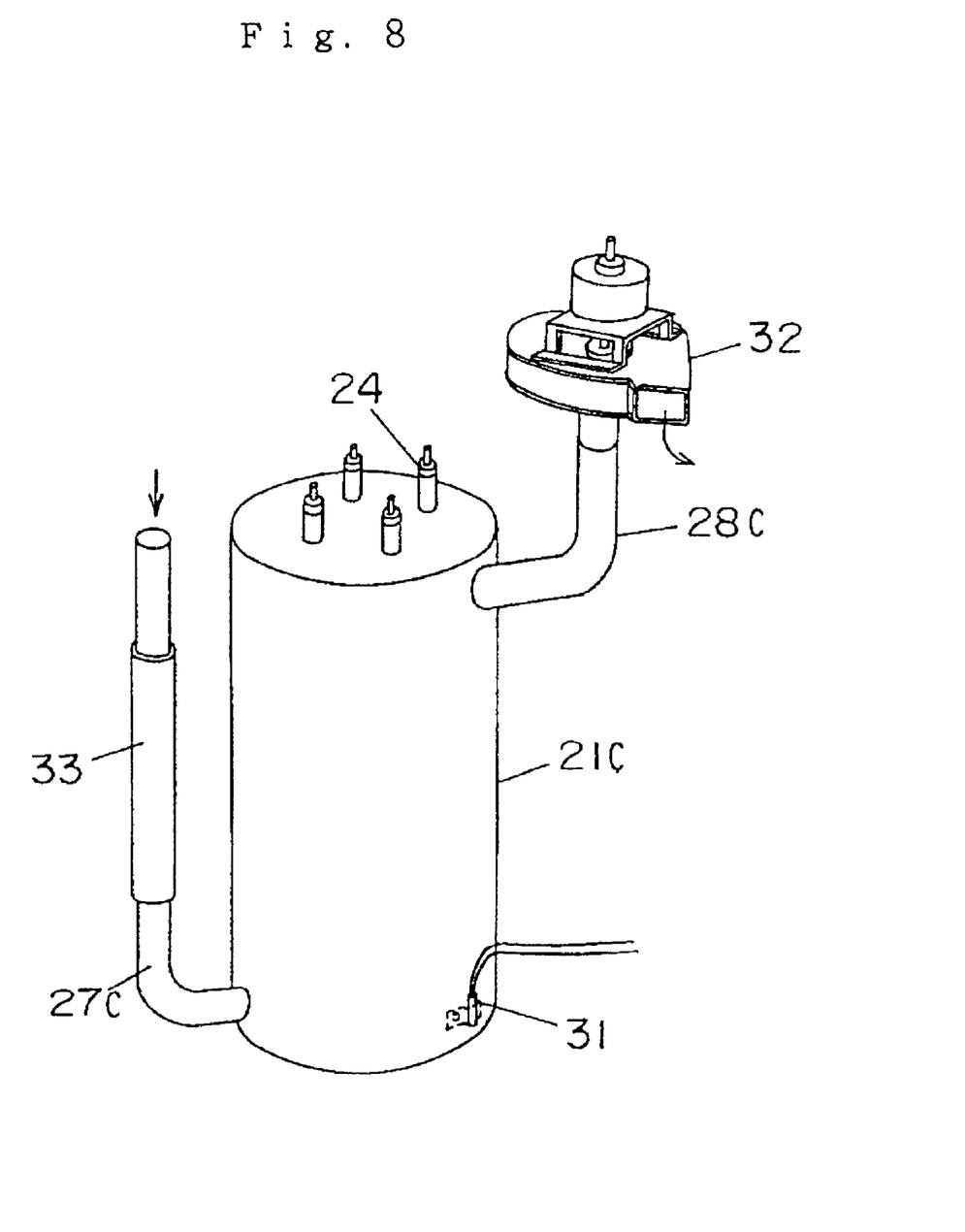
FIG. 8 is a perspective view of a deodorizer of the fourth exemplary embodiment of the present invention.

In FIG. 8, a temperature detector 31 is disposed near the exhaust gas inlet of case 21c. Also, a suction fan 32 is disposed in communication with outlet pipe 28c. Further, a heater 33 is disposed at the periphery of inlet pipe 27c. In the case 21c are disposed a plurality of fins same in number as in the third exemplary embodiment described above. A catalyst is disposed on the plurality of fins. The plurality of fins are divided into four passages. Catalyst heater 24 is disposed in each of the passages. Each catalyst heater 24 includes no bend portion and includes only straight portions. The deodorizer of this fourth exemplary embodiment is not provided with radiation fins disposed in the third exemplary embodiment. The others are same in configuration as the third exemplary embodiment.

In the above configuration, the temperature detector 31 detects the temperature of catalyst heater 24. In case abnormal combustion takes place in the case 21c, the temperature detector 31 will stop the power supply to the catalyst heater 24 or the power supply to the garbage disposer main body. In this way, burn-out trouble of the catalyst heater 24 or damage to the deodorizer may be prevented.

Since the suction fan 32 is connected to the outlet pipe 28c, the outlet pipe 28c is improved in exhausting capacity at high temperatures. Also, since a catalyst is disposed in the exhaust passages, the exhaust gas purifying capacity will be further improved.

Preferably, a low-temperature catalyst that functions at a lower temperature as compared with the catalyst held to the fins 2 is disposed in at least one of the outlet pipe 28c and inlet pipe 27c. By this configuration, the exhaust gas purifying capacity will be further improved.

In this exemplary embodiment, it is possible to adopt a configuration such that four catalyst heaters have U-shaped bend portions. Also, it is preferable to adopt a configuration such that radiation fins are disposed on the bend portions. Further, one catalyst heater and a plurality of fins having a catalyst can be stored in the case. By this configuration, same advantages as described above may also be obtained.

Exemplary Embodiment 5:

The fifth exemplary embodiment of the present invention will be described with reference to FIG. 9. Here, same reference numerals are used for the same component elements as those in the first exemplary embodiment described above. The description of the elements of same reference numerals will be omitted.

Figure 9:
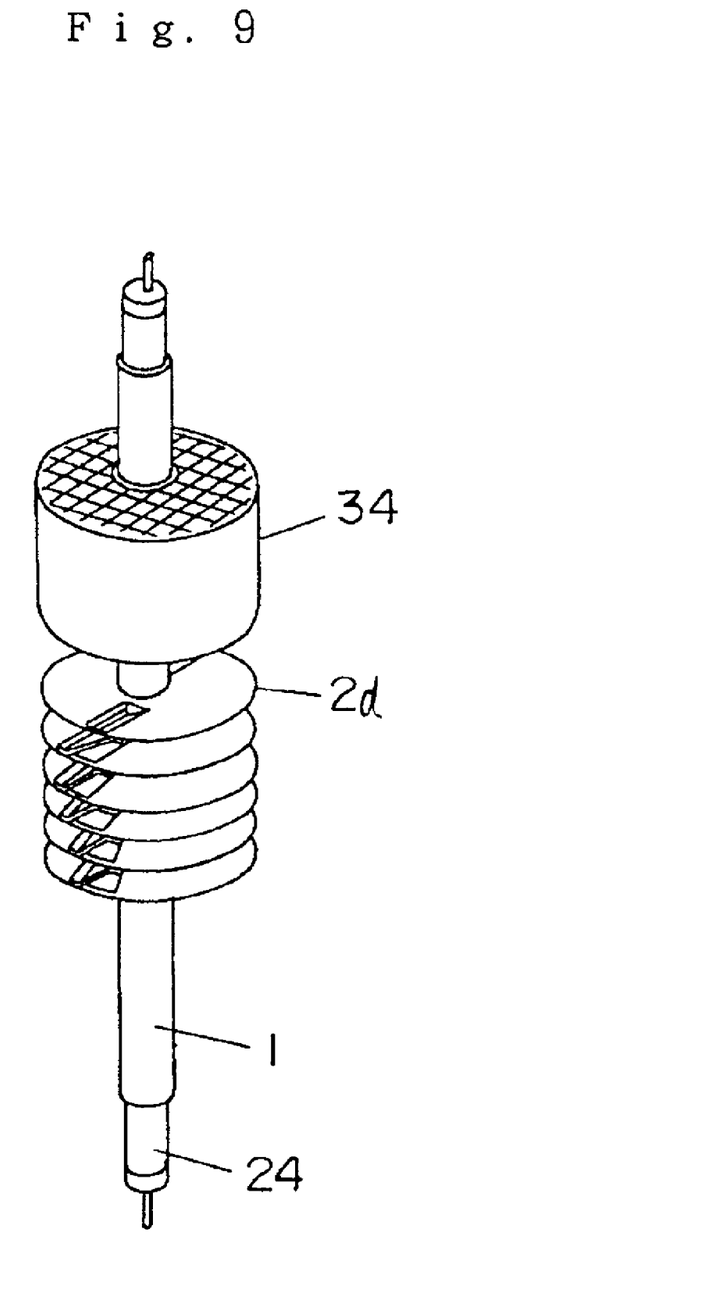
FIG. 9 is a perspective view of a deodorizer of the fifth exemplary embodiment of the present invention.

In FIG. 9, honeycomb catalyst 34 is fixed on metallic pipe 1. The honeycomb catalyst 34 has a honeycomb structure, and the catalyst is disposed in the honeycomb structure. Accordingly, the honeycomb catalyst 34 is compact and may have a large surface area. The others are substantially same in configuration as the exemplary embodiment described above. That is, a plurality of fins 2 are fixed around the metallic pipe 1. The plurality of fins 2 include a plurality of metal sheets 2d. Each of the metal sheets 2d has two through-holes. Two partition plates are disposed in the space between the metal sheets 2d. The radiation fins shown in FIG. 1 are not included in this exemplary embodiment. However, it is also possible to dispose radiation fins in the configuration of this exemplary embodiment.

In the above configuration, the exhaust gas is purified by a plurality of fins having a catalyst, and further purified by a honeycomb catalyst. Accordingly, the exhaust gas purifying capacity will be further improved. In addition, it is possible to obtain a compact purifier.

Exemplary Embodiment 6:

The sixth exemplary embodiment of the present invention will be described with reference to FIG. 10. Here, same reference numerals are used for the same component elements as those in the first exemplary embodiment described above. The description of the elements of same reference numerals will be omitted.

Figure 10:
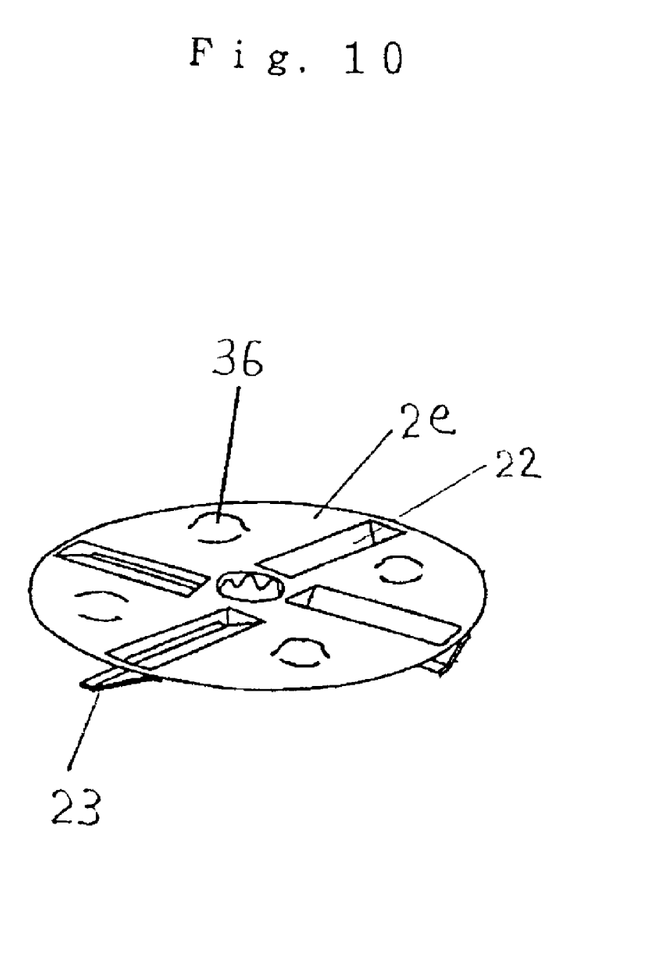
FIG. 10 is a perspective view of a deodorizer of the sixth exemplary embodiment of the present invention.

In FIG. 10, metal sheet 22e has a plurality of irregularities 36. The plurality of irregularities 36 are formed on the surface of each metal sheet 22e. A catalyst is held to the surfaces of the irregularities 36. Each of the metal sheets 22e includes four through-holes 22 radially formed therein. The space between the metal sheets 22e is partitioned by four partition plates. The irregularity 36 is located in each of the partitioned spaces. The others are same in configuration as the first exemplary embodiment described above. At least one irregularity 36 is located in each of the partitioned spaces. It is also possible to dispose a plurality of irregularities in each of the partitioned spaces.

In this configuration, the exhaust gas is separated into four passages, and then passes through the spaces between respective ones of the metal sheets 22e. Due to the irregularities 36, the metal sheets 22e are increased in surface area. Consequently, the catalyst held thereto increases in quantity.

Further, turbulence is generated when the exhaust gas flows on the metal sheets 22e. Accordingly, odor substance contained in the exhaust gas uniformly comes in contact with the surfaces of metal sheets 22e. As a result, the exhaust gas purifying capacity will be improved.

Figure 11:
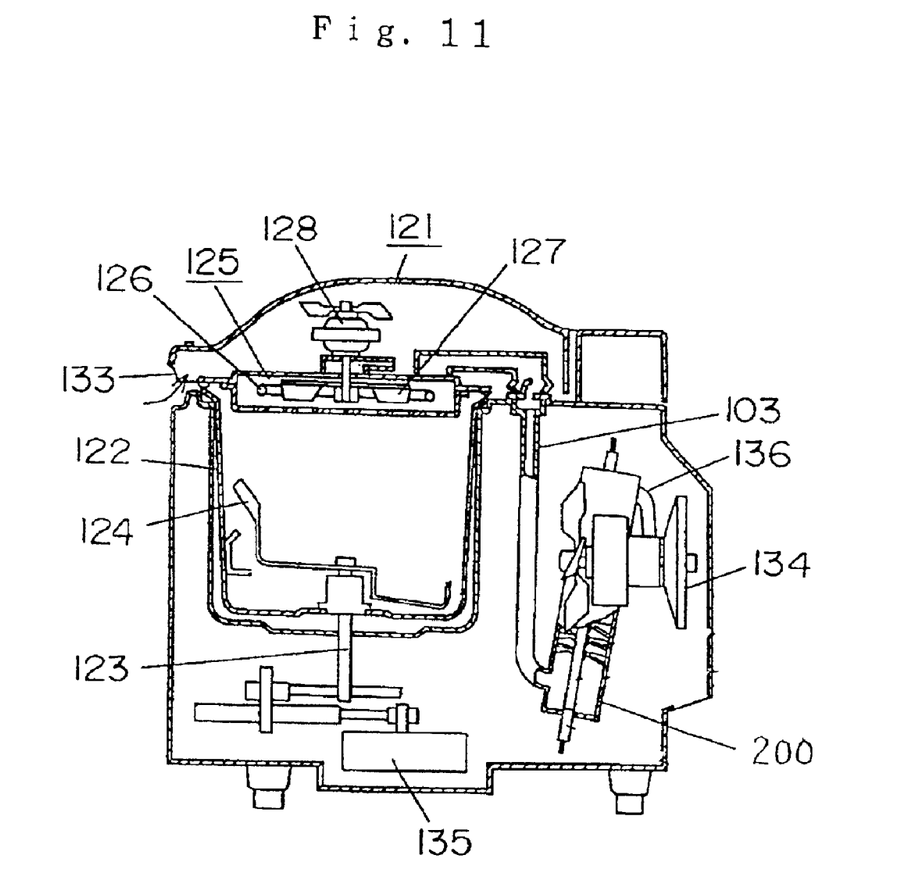
FIG. 11 is a cross-sectional view of a garbage disposer of the exemplary embodiment of the present invention.

Exemplary Embodiment 7:

The cross-sectional view of a garbage disposer in the exemplary embodiment of the present invention is shown in FIG. 11. In FIG. 11, only the deodorizer 200 is the difference in configuration from the conventional garbage disposer shown in FIG. 12. The other configurations of the garbage disposer of FIG. 11 are identical with those of the conventional garbage disposer shown in FIG. 12. Same reference numerals are used for the same component elements as those in FIG. 12. The description of the elements of same reference numerals will be omitted.

The deodorizer 200 of the present exemplary embodiment is same in configuration as the purifiers of the first to sixth exemplary embodiments. As the deodorizer 200, one of the purifiers mentioned in the first to sixth exemplary embodiments or a purifier having combined component elements of such purifiers is employed.

Due to this configuration, the exhaust gas purifying capacity will be improved. In addition, the size of the garbage disposer may be reduced. Particularly, in case the catalyst serves a deodorizing function, the deodorizing capacity of the garbage disposer will be improved.

In particular, when the purifier used in the garbage disposer is provided with a temperature detector 31 shown in FIG. 8 of the fourth exemplary embodiment, it is possible to stop the operation of the garbage disposer main body in case of abnormal combustion in the purifier. Accordingly, burnout trouble or damage to the purifier may be prevented. As a result, the safety of the garbage disposer will be enhanced.

In each of the above exemplary embodiments, as an example of the purifier, a deodorizer having a deodorizing function has been described with respect to one embodiment. However, as the purifier, it is not limited to such deodorizer, but an apparatus capable of eliminating other harmful substances contained in other exhaust gas can also be employed. In this case, a catalyst capable of eliminating harmful substances will be used instead of the deodorizing catalyst described above.

What is claimed is:

1. A purifier to purify exhaust gas, comprising:
   (a) a case having an inlet and an outlet;
   (b) a plurality of thin plates disposed in said case,
   said thin plates being arranged at predetermined intervals, and each of said thin plates having at least one through-hole;
   (c) a catalyst held to each of said thin plates;
   said catalyst having a function of purifying the exhaust gas;
   (d) partition plates disposed between the respective thin plates,
   said partition plates partitioning the spaces between the respective thin plates;
   (e) a plurality of U-shaped catalyst heaters are disposed through said plurality of thin plates so that each of said catalyst heaters goes through each of said spaces partitioned by said partition plates, each of said catalyst heaters for heating each of said thin plates, and
   (f) an external radiation fin,
   wherein at least two out of said catalyst heaters have a U-shaped bend portion and straight portions formed at either end of the bend portion;
   each of said straight portions is disposed piercing through said thin plates;
   said bend portion is located outside said case; and
   said external radiation fin is installed at said bend portion,
   the exhaust gas enters into said case from said inlet, and passes through the spaces formed between the respective thin plates, and each of said through-holes, and is exhausted from said outlet.

2. The purifier of claim 1, further comprising:
   a pipe;
   wherein said catalyst heater is installed in said pipe; and
   said plurality of thin plates are fixed around said pipe.

3. The purifier of claim 1, further comprising:
   an external radiation fin,
   wherein at least two out of said catalyst heaters have a U-shaped bend portion and straight portions formed at either end of the bend portion;
   each of said straight portions is disposed piercing through said thin plates;
   said bend portion is located outside said case; and
   said external radiation fin is installed at said bend portion.

4. A purifier to purify exhaust gas, comprising:
   (a) a case having an inlet and an outlet;
   (b) a plurality of thin plates disposed in said case,
   said thin plates being arranged at predetermined intervals, and each of said thin plates having at least one through-hole;
   (c) a catalyst held to each of said thin plates;
   said catalyst having a function of purifying the exhaust gas;
   (d) partition plates disposed between the respective thin plates,
   said partition plates partitioning the spaces between the respective thin plates; and
   (e) a plurality of U-shaped catalyst heaters are disposed through said plurality of thin plates so that each of said catalyst heaters goes through each of said spaces partitioned by said partition plates, each of said catalyst heaters for heating each of said thin plates,
   wherein the exhaust gas enters into said case from said inlet, and passes through the spaces formed between the respective thin plates, and each of said through-holes, and is exhausted from said outlet,
   an external radiation fin,
   wherein said plurality of catalyst heaters include a first catalyst heater and a second catalyst heater;
   said first catalyst heater includes a U-shaped first bend portion and two first straight portions formed at either end of said bend portion;
   said second catalyst heater includes a U-shaped second bend portion and two second straight portions formed at either end of said bend portion;
   each of said straight portions is disposed piercing through said thin plates;
   each of said bend portions is located outside said case;
   said external radiation fin is installed at each of said bend portions;
   said first bend portion and said straight portions of said first catalyst heater are heated; and
   only said second bend portion of said second catalyst heater is heated, and said second straight portions are not heated.

5. The purifier of claim 1, further comprising:
   a temperature detector disposed near the exhaust gas inlet of the case,
   wherein said temperature detector has a function of detecting the temperature of said catalyst heater and stopping the power supply to said catalyst heater.

* * * * *